W. L. FRY.
DISTANCE FINDER.
APPLICATION FILED SEPT. 21, 1912. RENEWED APR. 20, 1915.
1,163,594.
Patented Dec. 7, 1915.
2 SHEETS—SHEET 2.
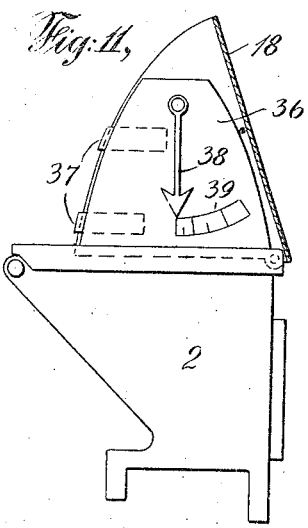
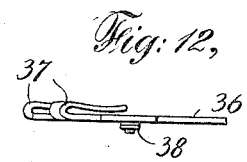
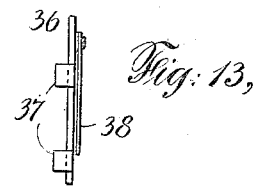
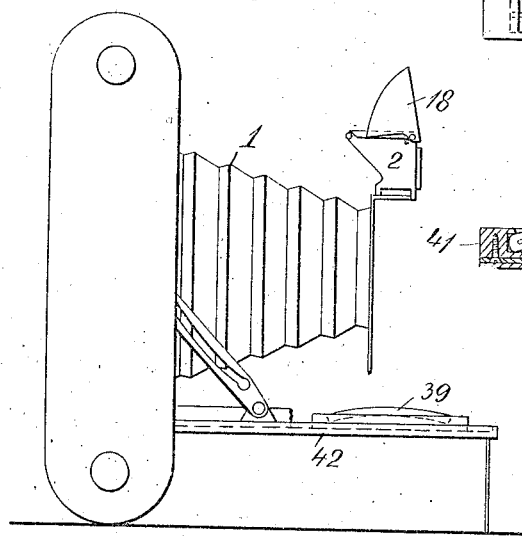
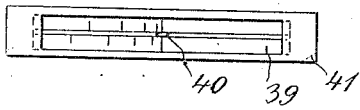
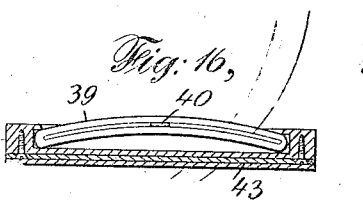
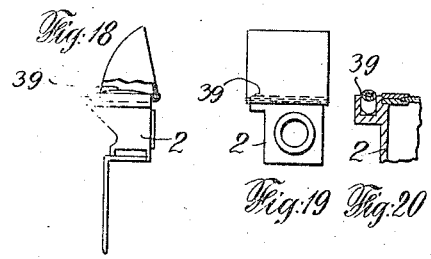
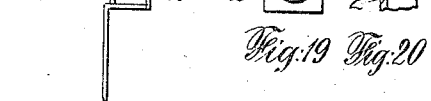

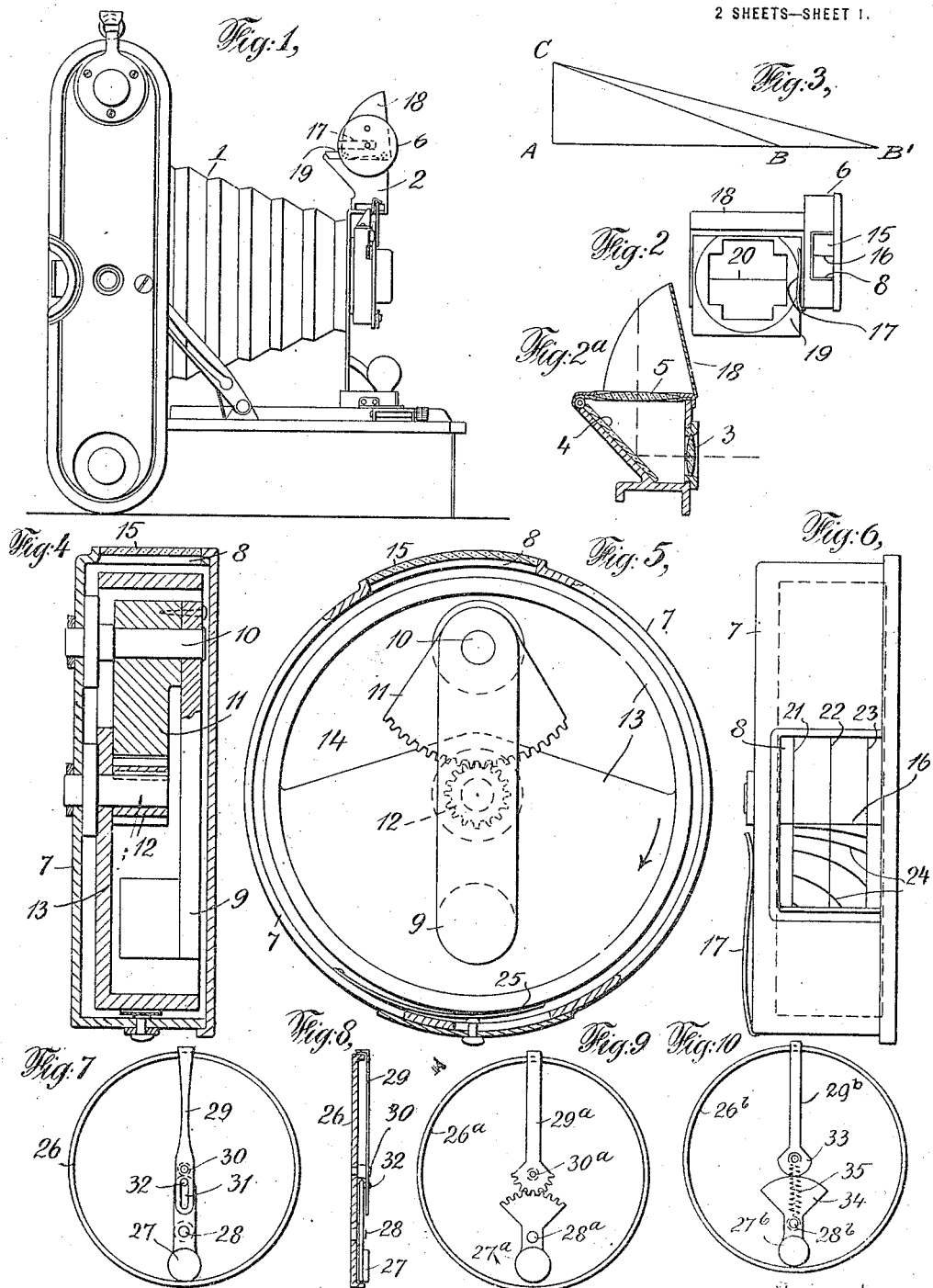

UNITED STATES PATENT OFFICE.

WALTER L. FRY, OF NEW YORK, N. Y.

DISTANCE-FINDER.

1,163,594.  Specification of Letters Patent.  Patented Dec. 7, 1915.

Application filed September 21, 1912, Serial No. 721,683. Renewed April 20, 1915. Serial No. 22,714.

*To all whom it may concern:*

Be it known that I, WALTER L. FRY, citizen of the United States of America, and a resident of New York city, county and State of New York, have invented certain new and useful Improvements in Distance-Finders, of which the following is a specification.

My invention relates to distance finders for photographic cameras, and comprises the combination with an image-forming view-finder, of means comprising a gravity-operated member for indicating the distance from the camera of the object to be photographed.

The objects of my invention are, to provide an improved distance finder for photographic cameras which may be used with greater facility than the devices for the same purpose heretofore used, and which shall be reasonably accurate, and to make such distance finders simple in construction, reliable and relatively inexpensive.

I will now proceed to describe my invention with reference to the accompanying drawings, and will then point out the novel features in claims.

In the said drawings: Figure 1 shows a side view of a photographic camera, Fig. 2 shows a plan view of the view finder of that camera with the distance finder attached, Fig. 2ª shows a vertical section of the view finder through the optical axis thereof, Fig. 3 a diagram illustrating the principle of operation of the distance finder, Fig. 4 an axial section of one form of the distance finder, Fig. 5 a transverse section of such finder, and Fig. 6 a top view of such finder, Fig. 7 a side view of an alternative form of the distance finder, and Fig. 8 an axial section thereof, Fig. 9 a side view of a further alternative form of such distance finder, and Fig. 10 a side view of another alternative form of such distance finder. Fig. 11 shows on an enlarged scale, a side elevation of a photographic view finder provided with a further alternative form of distance finder, the cover of the view finder being shown in section. Fig. 12 shows a top view of the distance finding attachment to the view finder illustrated in Fig. 11, and Fig. 13 shows an end view of such distance finding attachment. Fig. 14 shows an elevation of a camera provided with a further alternative form of distance finder operating upon the principle of the well known spirit level, Fig. 15 shows a top view of such distance finding attachment, and Fig. 16 a longitudinal section thereof, and Fig. 17 an end view thereof. Figs. 18, 19 and 20 show a view finder provided with a distance finding attachment of the spirit level type as a part of the view finder, Fig. 18 showing a side view of the finder provided with such distance finding device, a portion of the cover of the view finder being broken away, Fig. 19 showing a front view of the view finder, and Fig. 20 a detail sectional view of such view finder, showing also the distance finding attachment.

Referring to the drawings, and at first to Figs. 1 to 6 inclusive, 1 designates the camera itself, which camera may be of any of the usual constructions; 2 designates the view finder of such camera, 3 the objective lens thereof, 4 the reflector thereof and 5 the image lens thereof, and 6 designates the distance finder itself. In the construction shown in Figs. 4, 5 and 6, this distance finder comprises a substantially cylindrical case 7, having a sight opening 8 in the top thereof and having within it a pendulous weight 9 supported on an arbor 10, and having secured to it a gear sector 11 intermeshing with a pinion 12, itself secured to a flanged disk 13, such disk having an opening 14 for the passage of the arbor 10, which opening permits the flanged disk 13 to swing through a considerable angle without interference with the arbor 10. The sight opening 8 in case 7 is provided with a transparent plate 15, across the center of which is marked, in any suitable manner, a center line 16. The outer surface of the flange of the disk 13 is provided with suitable graduations indicating angles, and therefore, as will be seen hereafter, indicating distances. The case 7 is further provided with a spring clip 17 for attachment of the distance finder to the view finder 2 of the camera. Such view finders customarily are provided with a swinging light shield 18, which light shield, when the finder is in use, is turned upward as indicated in Fig. 1, and the spring clip 17 is adapted to engage the inner surface of one side of the light shield 18, resting upon the top surface 19 of the view finder, as shown particularly in Fig. 2.

The action of the distance finder will be understood by referring to the diagram, Fig. 3. As is well known, hand cameras, such as the particular camera illustrated, are customarily held at about the waist line of the user, when being used. The waist height of adults, at least, varies relatively little as compared with the variation of stature. In the diagram, Fig. 3, A represents the point at which the user of the camera is standing, and B and B' represent two points at which the bases of two objects to be photographed may be understood to be. The line A—B' is therefore a base line, which is assumed to be substantially horizontal. C designates the point at which the camera is held, the line A—C being the height at which the camera is held above the base line or ground. The user of the distance finder, holding the camera in the ordinary position for exposure, looks into the view finder 2, and sees on the image lens of that view finder, the object to be photographed, thereby centering the camera and the view finder, with respect to the object to be photographed. He then depresses the camera until the base of this object to be photographed is at the center of the image lens of the view finder. (Customarily, I provide this image lens or image plate with a transverse center line 20, for convenience in use of the distance finder, although this is not necessary, as it is easy to judge with almost absolute accuracy, the center of the field of the finder). In so depressing the camera, the angle of the optical axis of the camera is changed to the line C—B, or C—B', or some other oblique line extending from the point C to some point on the base line A—B'. The angle A—C—B or A—C—B', or other angle of depression of the camera, is, therefore, a direct function of the distance of the base of the object to be photographed from the camera. In so depressing the camera, the weight 9 is caused to swing, since this weight is free to move, and hangs vertically downward, notwithstanding the angle at which the camera may be held. Such motion of the weight 9 is multiplied, with respect to the flanged disk 13, by the gear 11 and pinion 12, the flanged disk 13, therefore, moving through a relatively great distance, for a relatively small movement of the weight 9.

As has been stated, the peripheral surface of the flange of disk 13 is provided with graduations which correspond to angles of deflection of the weight 9 with reference to the center line 16. In practice, the surface of the flange of disk 13 is graduated to distances rather than to angles. The user of the camera, having depressed the camera until the base of the object to be photographed is at the center of the finder, can immediately read upon the periphery of the flange of disk 13, the distance graduation which, at such angle of depression of the camera, is directly beneath the center mark 16. He, therefore, can at once focus his camera for the distance so indicated, by means of the usual distance scale and focusing device with which hand cameras are commonly provided, and can then raise the camera to bring the object to be photographed in the center of the finder field, and operate the camera shutter as usual for the exposure, with reasonable assurance that the camera has been properly focused.

In practice, to compensate for varying heights at which the camera may be held, I provide the peripheral surface of the flange of disk 13 with a plurality of longitudinal lines 21, 22 and 23, corresponding to different heights at which the camera may be held, and I mark suitable distances A—B, A—B', etc., on these lines 21, 22 and 23, according to some accepted unit of linear measurement, and I may also provide curved transverse lines 24 connecting corresponding distance marks on the several longitudinal lines 21, 22 and 23. The user of the camera will soon learn along what line 21, 22 or 23, (or it may be, along some imaginary line between lines 21 or 22, or between 22 and 23) distances should be read by him, on the lines 24. The user of the camera will also soon learn to make such correction as may be necessary in case the base line is not horizontal; but in most cases the base line is horizontal.

I am aware that heretofore distance estimating instruments have been employed, comprising sighting means, together with a gravitating member to indicate angles of inclination, and therefore distance. But so far as I am aware the view finder itself of a camera has not heretofore been employed as a sighting means for the distance finder. In the case of a camera, such use of the view finder itself of the camera is extremely convenient, since it permits the camera to be held, when determining distance, at the position of exposure, and since it permits finding of distance at the instant when the user has positioned the camera to bring the object to be photographed within the field of view of the finder. Therefore, the entire operation of sighting the camera, focusing, and exposing, may be done in an instant.

The flanged disk 13 may be provided with a convenient brake 25 for holding said flanged disk and the weight 9 stationary when the distance finder is not in use, and so avoiding unnecessary wear of the parts.

The bottom of the spring clip 17, since it rests upon the top of the finder, positions the distance finder accurately with reference to the view finder.

Various alternative constructions of my distance finder are possible. In the construction shown in Figs. 7 and 8 I illustrate a flanged disk 26 having a gravitating weight 27, pivoted thereto at 28, and having a pointer 29 pivoted thereto at 30, the pointer 29 having a slot 31, and the weight 27 having a pin 32 working in that slot.

In the construction shown in Fig. 9, the pointer there designated by numeral 29ª has a gear connection with the weight there designated by numeral 27ª.

In the form shown in Fig. 10 the connection between the pointer, there designated by numeral 29ᵇ, and the weight, there designated by numeral 27ᵇ, is by means of friction-sectors 33 and 34, the pivot 28ᵇ of the weight 27ᵇ having slight clearance in a hole of disk 26ᵇ, in which it is mounted, and a spring 35 being provided for holding the surfaces of the sectors 33 and 34 in contact.

In the form of distance finding device shown in Figs. 11, 12 and 13, the distance finder comprises a plate 36 adapted to be slipped within the cover 18 of the view finder and to be secured thereto by means of spring clips 37; and this plate 36 is provided with a depending pivoted combined weight and pointer 38 adapted to move over a scale 39 provided on one surface of plate 36.

In the construction shown in Figs. 14, 15, 16 and 17, I employ a device working on the principle of the well known spirit level, and comprising a tube of transparent material 39, having within it liquid and an air bubble 40. This tube 39 is curved, and set within a frame 41, preferably secured to some suitable fixed portion of the camera, for example, the camera bed 42 (Fig. 14), by means of a hinge 43, which permits the distance finding device to be turned up into proper position for action when the camera is turned on its side. The tube 39 is provided with scale graduations, as indicated particularly in Fig. 15. It will be recognized that in such a spirit tube device as shown in Figs. 15, 16 and 17, the liquid within the tube is a gravitating weight.

The spirit tube device may also be embodied in the view finder itself. This is illustrated in Figs. 18, 19 and 20, wherein 2 designates the view finder of ordinary construction, except that it is provided on one side with a recess adapted to receive a spirit tube 39 such as shown in Fig. 16.

It will be recognized that my distance finder, in its various forms, beside serving as a distance finder, also serves as a level, for when the pointer of the distance finder indicates infinite distance, the camera will be level.

What I claim is:—

1. The combination with a camera view finder comprising image-producing means, of a distance finder secured in fixed relation thereto and comprising indicating means showing degree of inclination of the optical axis of such view finder, said view finder constituting sighting means for the distance finder, the said indicating means being visible simultaneously with the image-producing means of the view finder.

2. The combination with a camera view-finder comprising reflecting image-producing means, of a distance-finder secured in fixed relation thereto, and comprising indicating means showing degree of inclination of the optical axis of such view-finder, the view-finder constituting sighting means for the distance finder, the said indicating means being visible simultaneously with the image-producing means of the view-finder.

3. The combination with a camera view-finder, of a distance finder secured thereto in proximity to the image plate of such view-finder, and comprising means visible simultaneously with the image of such view-finder, indicating distance of object to be photographed from such view-finder, such view-finder constituting sighting means for the distance finder.

4. The combination with a camera view-finder comprising image-producing means, of a distance finder secured to such view-finder and comprising distance-indicating means visible simultaneously with the image-producing means of said view-finder, such view-finder constituting sighting means for said distance finder.

In testimony whereof I have signed this specification in the presence of two subscribing witnesses.

WALTER L. FRY.

Witnesses:
H. M. MARBLE,
D. A. DAVIES.